United States Patent
Thoms et al.

(10) Patent No.: US 9,932,957 B2
(45) Date of Patent: Apr. 3, 2018

(54) SWITCHABLE HYDROSTATIC ADJUSTING DEVICE

(71) Applicant: DANFOSS POWER SOLUTIONS GMBH & CO OHG, Neumunster (DE)

(72) Inventors: Reinhardt Thoms, Holzbunge (DE); Martin Wuestefeld, Neumunster (DE)

(73) Assignee: DANFOSS POWER SOLUTIONS GMBH & CO OHG, Nuemunster (DE)

( * ) Notice: Subject to any disclaimer, the term of this patent is extended or adjusted under 35 U.S.C. 154(b) by 403 days.

(21) Appl. No.: 14/678,418

(22) Filed: Apr. 3, 2015

(65) Prior Publication Data
US 2015/0285214 A1 Oct. 8, 2015

(30) Foreign Application Priority Data
Apr. 3, 2014 (DE) .................. 10 2014 206 460

(51) Int. Cl.
*F03C 1/00* (2006.01)
*F16H 61/42* (2010.01)
(Continued)

(52) U.S. Cl.
CPC .......... *F03C 1/005* (2013.01); *F15B 11/0423* (2013.01); *F16H 61/42* (2013.01);
(Continued)

(58) Field of Classification Search
CPC .................. F16H 61/42; F16H 61/433; F15B 2211/20553
(Continued)

(56) References Cited

U.S. PATENT DOCUMENTS 4,756,157 A * 7/1988 Appel ................... F16H 61/438
60/444
7,121,188 B2 * 10/2006 Thoms ................... F01B 3/102
91/506
(Continued)

FOREIGN PATENT DOCUMENTS

CN 201841947 U 5/2011
CN 102878126 A 1/2013
(Continued)

OTHER PUBLICATIONS

Chinese Office Action issued by the State Intellectual Property Office (SIPO) dated Sep. 27, 2016; Chinese Patent Application No. 2015101544971; Danfoss Power Solutions.
(Continued)

*Primary Examiner* — Thomas E Lazo
(74) *Attorney, Agent, or Firm* — Zarley Law Firm, P.L.C.

(57) ABSTRACT

Hydrostatic adjusting device of a hydraulic machine, the swept volume of which can be adjusted by way of a servo adjusting unit, having a control unit which has a control cylinder which has at least one inlet for pressurized hydraulic fluid, at least one servo connector for a connecting line to the servo adjusting unit, and at least one outlet to a hydraulic fluid collecting region. A control piston is arranged in the control cylinder, which control piston can be displaced by means of at least one control piston actuator and has control edges. In interaction with control edges which are configured in the control cylinder, the inlet or the outlet can be alternately connected hydraulically to the connecting line, whereby the pressure which prevails in the connecting line can be returned hydraulically via a control line to at least one end side of the control piston.

17 Claims, 5 Drawing Sheets

(51) Int. Cl.
*F15B 11/042* (2006.01)
*F16H 61/475* (2010.01)

(52) U.S. Cl.
CPC .. *F16H 61/475* (2013.01); *F15B 2211/20553* (2013.01); *F15B 2211/26* (2013.01); *F15B 2211/6658* (2013.01)

(58) Field of Classification Search
USPC .................................................. 60/445, 452
See application file for complete search history.

(56) References Cited

U.S. PATENT DOCUMENTS

| | | | |
|---|---|---|---|
| 7,299,738 B2* | 11/2007 | Thoms | F04B 49/06 91/506 |
| 7,415,821 B2* | 8/2008 | Heinz | F03C 1/003 60/445 |

FOREIGN PATENT DOCUMENTS

| | | | | |
|---|---|---|---|---|
| DE | 2208172 A | 2/1972 | | |
| DE | 102004033376 B3 | 12/2005 | | |
| DE | 102008052338 B3 | 4/2010 | | |
| DE | 102011079691 | * | 8/2012 | ............ F04B 49/002 |
| DE | 102011079691 B3 | 8/2012 | | |
| EP | 1502043 B1 | 11/2005 | | |

OTHER PUBLICATIONS

CN201841947U_English Abstract.
CN102878126A_English Abstract.
DE102011079691B3_English Abstract.

\* cited by examiner

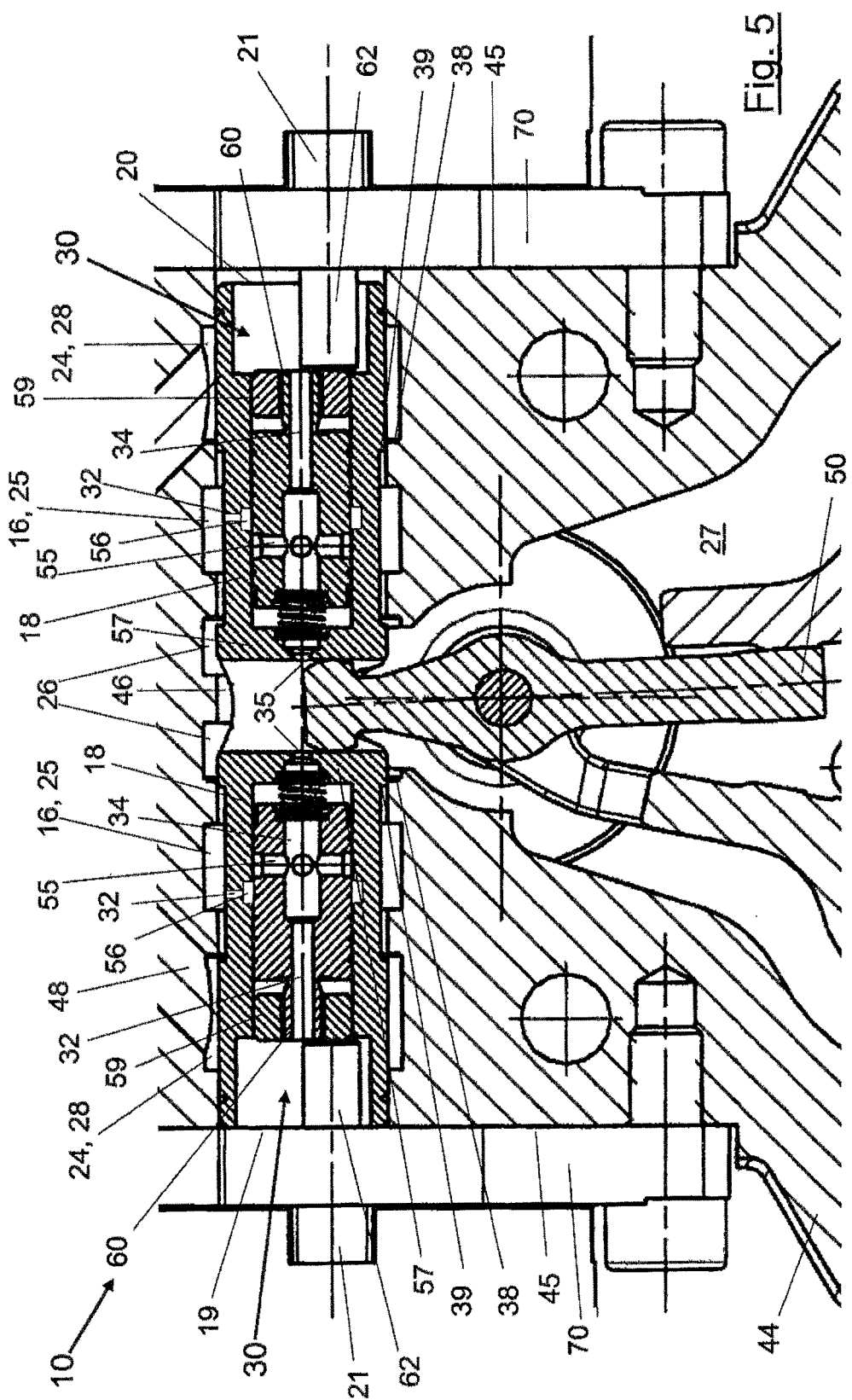

SWITCHABLE HYDROSTATIC ADJUSTING DEVICE

CROSS REFERENCE TO RELATED APPLICATION

This application claims the benefit of German Patent Application No. DE 10 2014 206 460.0 filed Apr. 3, 2014.

BACKGROUND OF THE INVENTION

The invention relates to a hydrostatic adjusting device of a hydraulic machine, the swept volume of which can be adjusted, in accordance with the precharacterizing clause of claim 1, in particular to hydraulic machines which can have their delivery volume or displacement set via a servo adjusting unit and via an adjusting element which is connected mechanically to the latter, for example a swashplate or a bent axis. Here, the concept of the invention comprises all types of hydraulic machines with a servo adjusting means which can be controlled by way of a control slide. The invention preferably relates to hydrostatic adjusting devices for hydraulic machines with a mechanical position return means of the control slide or control piston into the zero position after the adjustment of the hydraulic machine has taken place.

For example, in hydrostatic propulsion drives with a closed or open hydraulic fluid circuit, hydraulic pumps and hydraulic motors are used which usually have controlled servo adjusting means for setting the power output or power consumption of the hydraulic machine. Here, in many cases, the position or swiveling-out of the adjusting element, for example the swashplate or the bent axis, is controlled via a servo adjusting device and the delivery volume of the hydraulic machine is set in this way. This preferably takes place proportionally to an input signal to an actuator, which input signal can be a mechanical force signal, for example as a consequence of a lever movement, or else an electrically generated force signal, for example as a consequence of a current to a proportional magnet. Via a position return device which can be, for example, a mechanical position return means according to DE 10 2004 033 376 B3, the control piston which is deflected by the actuator is moved back into its starting position when the preselected delivery quantity/displacement of the hydraulic machine is reached, which starting position is preferably the neutral position. At the same time, a calibration between the input signal and the real position of the adjusting element is realized in this way, and a regulating circuit between the control apparatus and the adjusting element of the servo adjusting means is closed. In the starting position of the control piston, a return force of the position return apparatus is in force equilibrium with the actuator force.

A hydrostatic adjusting device which forms the generic type for the, for example, infinitely variable adjustment of the delivery flow of a hydraulic delivery device having two delivery directions is described, for example, in DE 10 2008 052 338 B3 and forms the precharacterizing clause of claim 1. The known adjusting device for centering control pistons has a control unit which exhibits a control cylinder which is provided with two inlets for pressurized hydraulic fluid, with two servo connectors for connecting lines to a servo adjusting unit, and at least one outlet to a hydraulic fluid collecting region. A control piston is arranged in the control cylinder, which control piston can be displaced by means of in each case one electromagnet which functions as an actuator and acts on its end faces. By way of an interaction of a plurality of control edges of the control piston with control edges which are configured in the control cylinder, the two inlets or the outlet to the tank can be connected hydraulically alternately to the connecting lines to the servo adjusting unit, as a result of which the servo pressure in the servo cylinders of the servo adjusting unit can be adapted to the performance requirements of the hydraulic machine. Via an adjusting element which is coupled mechanically to the servo pistons, the delivery volume of the hydraulic machine is set. Via a mechanical position return means, the control slide or control piston is returned into its starting position, preferably into the neutral position, by way of elastic prestressing forces after the preselected delivery output has been reached. At the same time, the servo pressure which prevails in the connecting lines to the servo adjusting unit is returned hydraulically at a reduced level via in each case one of two bypass lines to one of the two end sides of the control piston. Here, the pressure level which prevails in the servo chambers of the servo cylinder which are sealed per se is fed at a reduced level to the end faces of the control piston and is discharged further to a hydraulic fluid collecting region of the hydraulic machine, which hydraulic fluid collecting region is under discharge pressure. On account of the return of the servo pressure at a reduced level to the end sides of the control piston, the control piston is held or centred in its zero position in addition to the spring force of the mechanical position return means. The reduction of the pressure in the bypass lines takes place in a conventional way via orifice plates, throttles or nozzles.

The configuration of the hydrostatic adjusting device according to DE 10 2008 052 338 B3 serves exclusively to centre the control piston in the zero position, in the case of a preferably negative overlap of the control edges in the control cylinder. The hydrostatic adjusting device described in the patent DE 10 2008 052 338 B3 for centering control pistons exhibits a certain tendency towards load dependence despite a mechanical position return means which assists load independence of the hydraulic machine.

In the context of the present description of the invention, "load dependence" of an adjusting device is to be understood to mean that the level of the variable external loads which act in each case on the hydraulic machine has an influence via the adjusting device on the level of the pressures which prevail in the servo chambers, and the delivery volume of the hydraulic machine changes in a load-dependent manner as a result of a change in the relative position of the servo piston in the servo cylinder. If, for example, a work machine which is equipped with a hydrostatic drive changes from constant level driving to mountainous driving, the high pressure in the working circuit of the hydrostatic drive rises. The hydraulic pump of the hydrostatic drive tends to endeavour to avoid this pressure increase, by attempting to reduce its delivery quantity, the adjusting element of the servo adjusting means generating an increased force in the direction of the zero position of the pump. This force is supported on the servo piston which is loaded with hydraulic fluid under control pressure, and the servo piston tends to be displaced in the direction of a reduction in size of the servo chamber. If a movement of this type of the servo piston is not permitted as a result of the system, because, for example, a position return device counteracts a load-induced tendency to change the delivery volume of the hydraulic machine, this is called a load-rigid hydrostatic drive. If, in contrast, a load-induced movement of this type of the servo piston is permitted (in a controlled manner), this is called a load-flexible hydrostatic drive, since the load-induced tendency to change the delivery volume of the hydraulic machine is then followed at least partially.

The additional pressure forces on the control piston on account of the returned servo pressures according to DE 10 2008 052 338 B3 act counter to the forces which are exerted on the control piston by the electromagnets, as a result of which the position of the control piston in the control cylinder can be changed. As a further consequence, the pressures in the servo chambers of the servo cylinder and therefore the position of the servo pistons in the respective servo cylinders are adapted in a load-dependent manner. The associated positional change of the adjusting element brings about a load-dependent adaptation of the delivery volume of the hydraulic machine. For example, as the load on the hydrostatic drive rises, the delivery quantity of a hydraulic pump is reduced if the pressure in the working circuit of the hydraulic machine increases. The adjusting unit which is described in DE 10 2008 052 338 B3 is therefore "load-sensing" to a certain extent.

Whether a load-rigid or a load-flexible hydrostatic drive of a work machine is to be used depends, for example, on performance requirements during the use of the hydrostatic drive, the load situation and/or the performance reserves of the drive motor which drives the hydrostatic drive. In many applications, predominantly in the case of mobile work machines, a change between both types of servo adjustment in adaptation to the respective application would be advantageous, that is to say between load-rigid and load-flexible. For example, a load-rigid response of the hydraulic machine would be advantageous for driving at a constant speed, independently of, for example, uphill or downhill slope, and therefore independently of the external load. In another application of the same vehicle, the available drive power is always to be converted, for example, into the maximum possible driving speed depending on the uphill slope or the underlying surface, without overloading the drive, that is to say the drive motor. This load-flexible response is often called automotive driving. A road sweeper machine is to be mentioned as one example which does not restrict the concept of the invention, which road sweeper machine preferably drives at a constant (slow) speed during sweeping, in order to achieve a sweeping result which is as satisfactory as possible. However, the sweeping machine is to be capable of driving at a maximum possible speed during its journey from and to the location of use, for example on the journey to the storage site, in order to keep the time lost as low as possible. It is desirable here that the propulsion drive of the sweeping machine can be operated in a load-rigid manner in the first case and in a load-flexible manner in the second case depending on the use.

The patent DE 10 2004 033 376 B3 describes a load-rigid, hydraulic drive having a servo adjusting device and a mechanical position return means. A load-rigid adjusting device of this type can be controlled, for example, in a load-adapted manner if a microcontroller which is connected to a corresponding sensor system is provided with the corresponding information about the existing load and the available performance. The microcontroller then converts this information into adequate input signals for the proportional magnets of the adjusting device. Costs, reliability, reaction speed and controllability set limits for this embodiment, however.

Conversely, a load-dependent or load-flexible servo adjusting means can also be actuated via a suitable sensor system and a microcontroller in such a way that the load dependence is minimized. A microcontroller, for example, which is connected to a corresponding sensor system also requires the necessary information in this case about the existing load which it converts into adequate input signals for the adjusting unit. In addition to costs, reliability and controllability or control time, as is also the case in the load-rigid system mentioned above, the control operation which is based on electric signals is a technical problem with regard to rapid and precise controllability which can be managed only by the use of complicated and expensive electronics.

The invention is therefore based on the object of providing a hydrostatic adjusting device of the type mentioned at the outset which is suitable for being able to change, during operation of a hydrostatic drive, between a load-rigid and a load-flexible response of the drive and vice versa in accordance with a machine operator and/or the use conditions of the hydraulic drive. The technical solution for an adjusting device of this type is to be able to precisely and rapidly switch over the load-rigid response of a hydrostatic drive to a load-flexible response of the hydrostatic drive and vice versa, it preferably being possible for the sensitivity of the load-flexible response to be set, particularly preferably in an infinitely variable manner. Here, the adjusting device is to be capable of being realized in a robust way and such that it manages with few components with a low space requirement and low costs. Furthermore, the use of sensor systems and/or electronics is to be restricted to a minimum.

SUMMARY OF THE INVENTION

This object is achieved according to the characterizing features of the adjusting device according to claim 1 by virtue of the fact that, in an adjusting device according to the precharacterizing clause of claim 1, at least one control line which returns the pressure in the servo cylinder to an end side of the control piston can be opened and closed as required.

The invention proceeds from the finding that a hydrostatic drive having an adjusting device and at least one control line or bypass line according to DE 10 2008 052 338 B3 exhibits a tendency for a load-flexible operating response, in accordance with the additional forces which act on the end faces of the control piston on account of the rising or dropping pressures from the working circuit. As a result of the changing, increasing or decreasing external loads, the pressures in the servo chambers change correspondingly. The load-flexibility is generated by way of the pressure which is returned from the servo chambers via the control lines on at least one end side of the control piston, as a result of which the said control piston is displaced out of its current relative position in the control cylinder. In drive operation of a hydrostatic drive, the pressure of the active servo side, that is to say the servo side, the servo chamber of which is loaded with hydraulic liquid under control pressure, is returned to the end face of the passive side of the control piston, that is to say to that end face of the control piston which is not loaded with force by an actuator.

According to the invention, this operating response can be changed into a load-rigid response, by that control line being closed which guides the pressure from the servo chamber back to the end side of the control slide. The forces which act on the control piston are then defined solely by the actuation of the actuator which acts on it and a possibly mechanical position return device. A dependence on the external load which acts on the hydraulic machine is suppressed in this way. Fluctuations in the servo pressure in the servo cylinder thus no longer have an effect on the forces on the control piston.

The above-described operating response of a hydrostatic drive and its changeover from load-flexible (=load-dependent) to load-rigid (=load-independent) can be used here both in the case of hydrostatic drives which can be adjusted on one side and in the case of drives which can be adjusted on two sides. However, the switchover of the operating response can also be provided only for one side of a hydrostatic drive which can be adjusted on two sides. However, both sides of a hydrostatic drive which can be adjusted on two sides can preferably be switched from load-flexible to load-rigid and vice versa. Here, in one preferred embodiment, the two sides can be switched individually, with the result that, for example in an overrun mode of the hydrostatic drive, when the active side of the servo adjusting means becomes the passive side and vice versa, the increased servo pressure of that side of the servo adjusting means which is active in the overrun mode is not guided to the active end side of the control piston of the control unit, which end side is loaded by an actuator. An available supporting torque of the drive motor can thus be used to brake the hydrostatic drive. In the case of a two-side, separately adjustable hydrostatic drive, one side of the control apparatus can thus likewise be switched in a load-dependent manner and the other side can be switched in a load-rigid manner, for example load-flexible on the first side for driving uphill and load-rigid on the second side for driving downhill in the same driving direction. Of course, this functionality is to be maintained even if the drive direction is changed. Both sides can therefore preferably be switched individually. Furthermore, the concept of the invention likewise includes a simultaneous switchover of both sides, from one operating mode into the other.

In a first embodiment of the concept of the invention, a hydraulic machine which can be adjusted on one side has a hydrostatic adjusting apparatus, by way of which the delivery volume or displacement of the hydraulic machine can be adjusted. At the same time, the delivery volume or displacement which is set is reported via a position return device to the control slide of the control unit of the hydraulic machine, which preferably takes place mechanically. In order to set a delivery volume or displacement, the control slide is preferably first of all deflected out of its starting position by way of a proportional magnet and releases a cross section of an inlet duct on the control cylinder, at which control pressure prevails. At the same time, the control slide opens a cross section to a connecting line to the servo adjusting means. As a result of the pressure increase in a servo cylinder of the servo adjusting means, the associated servo piston is displaced. With displacement of the servo piston, an adjusting element, for example a swashplate of an axial piston machine, is deflected. The delivery volume/displacement of the hydraulic machine changes as a result. Via the position return device, the control piston or control slide is moved back again into its starting position, the current which is applied to the proportional magnet (actuator) being maintained. The forces which act on the control piston by way of the actuator on one side (active side) and the position return device on the other side (passive side) are in equilibrium in the case of a constant operating mode of the hydraulic machine, for example during level driving at a constant speed.

If the surrounding parameters change because, for example, an incline is to be driven up, the pressure in the servo chamber rises, on account of the rising operating pressure of the hydraulic machine. As a result of the return of the pressure in the servo chamber to the passive side of the control piston which lies opposite the actuator, the above-described force equilibrium is disrupted, since the servo pressure which is returned to the passive end side of the control piston displaces the control piston counter to the actuator force. In this example, as a result, the opening cross section to the connecting line of the servo adjusting means is reduced in the control unit, as a result of which the pressure in the servo chamber drops and the servo piston can be displaced in the direction of a reduction in size of the servo chamber. At the same time, the swiveling-out, that is to say adapting the delivery volume/displacement of the hydraulic machine, is reduced in the case of hydraulic pumps and is increased in the case of hydraulic motors. The (counter-) force from the position return device on the control piston counter to the actuator force drops, until a (new) force equilibrium again prevails on the control piston. The adjusting device according to the invention can optionally permit or prevent this load-induced influence of modified surrounding parameters, by it being possible according to the invention for the control line, by way of which the servo pressure is guided to the passive end side of the control piston, to be opened (load-flexible operating type) or closed (load-rigid operating type). Here, the concept of the invention also includes a partially open control line, whereby the sensitivity or the load-sensitivity can be set depending on the degree of opening of the control line. It is true here that a load dependence of a hydrostatic drive is more pronounced the more powerfully the returned servo pressure can act on a (passive) end side of the control piston.

In an analogous manner to the above-described implementation of the concept of the invention for a hydraulic machine which can be adjusted on one side, the invention is likewise used for hydraulic machines which can be adjusted on two sides. Here, an apparatus for closing and opening the respective control lines can be arranged individually for each side. In many applications, in particular in propulsion drives, in which forward driving requires different operating parameters to driving in reverse, hydraulic machines which can be adjusted on two sides with in each case one shut-off means per control line will be provided. This applies analogously to all hydrostatic drives which are included by the concept of the invention, such as drives for raising and lowering loads or the rotational drive of an excavator or the bucket drive of earth-moving machines.

In one preferred embodiment, the opening and closing of the control line is brought about, for example, by a 2/2-way load response valve. A separate actuator or valve actuating apparatus can be provided in order to actuate the directional load response valve, which separate actuator, for example in the form of a proportional magnet, switches the directional valve by way of the application of an electric current. In a further preferred embodiment, a separate 2/2-way valve is provided for each control line. By way of an arrangement of this type, both delivery directions can be switched to load-flexible or load-rigid independently of one another. Further preferably, the load response valve can be configured as a pure switchover valve which can be transferred from a closed position into an open position. Yet further preferably, the load response valve can be configured as a control valve or proportional valve which can also be moved in a variable manner into switching positions, in which a passage for hydraulic liquid in the control line is opened or closed only partially. Here, the load response valve can be transferred, for example, continuously from a completely closed into a completely open state, as a result of which the magnitude of the load-flexibility or the load-rigidity of the hydraulic machine can be set. Here, a proportionally behaving load response valve is preferably actuated by a proportional magnet as actuator which displaces, for example, a valve slide counter to a valve spring and thus closes the passage for hydraulic liquid further and further with increasing actuator force, until the load response valve is closed completely, or opens it further and further until the load response valve is opened completely. This applies analogously in the case of a decrease in the actuator force.

In another preferred embodiment, the load response valve or the load response valves for opening and closing the control line or the control lines is/are integrated into the respective control piston side. Here, the control line on the respective control piston side is realized, for example, by way of a radial bore in a fluidic connection with a through bore which lies in the axial direction in the control slide. A valve slide, for example, for opening and closing the radial bore is then arranged in the through bore. Here, the valve slide can be actuated by the respective actuator which acts on the corresponding control piston end face. The valve slide for closing and opening the control line, that is to say the radial bore, is preferably arranged in such a way that, upon actuation of the actuator, first of all the control line is opened or closed by the valve slide and the control piston is displaced in its position by the actuator only when a stop of the valve slide on the control piston or the actuator reaches a stop or a shoulder of the control piston. This achieves a situation where the passive control piston side can be switched to load-rigid or load-flexible by the actuator which is arranged there depending on the desired method of operation of the hydrostatic drive. As mentioned at the outset, in the case of a force-generating hydrostatic drive, the pressure is guided from the active side of the servo adjusting means via the control line to the passive end side of the control piston. The desired load response can therefore be switched or its sensitivity can be set by way of the actuator which is arranged on the passive side of the control piston and does not participate in the control of the hydraulic machine. The said actuator which is arranged on the passive side of the control piston requires only a low force to this end, in order to move the valve slide of the 2/2-way load response valve which is integrated, for example, into the servo piston counter to a restoring spring force of a prestressed load response valve spring.

The load response valve in the control line is preferably integrated into the control piston in such a way that the actuator which actively adjusts the hydraulic machine moves the directional load response valve into a position, in which the control line is closed. Since that side of the control device, on which the inactive actuator is arranged, is preferably connected to the active side of the servo adjusting means, via the actuator which does not participate in the adjustment of the hydraulic machine, the load response of the hydraulic machine, that is to say whether load-rigid or load-flexible, can be switched by the said actuator, or the level of the load-flexible effect can be set, without influencing the preselected performance setting of the hydrostatic drive. This applies analogously to hydraulic machines which can be adjusted on one side and the delivery volume displacement of which can be set, for example, by way of an electrically actuable proportional magnet. Here, the load response can be set or switched, for example, by way of a further proportional magnet, the pressure force of which can be of substantially weaker configuration.

Further preferably, a branch is provided in the control line, which branch discharges the hydraulic fluid which is returned via the control line to a hydraulic fluid collecting region. The pressure is backed up via a back-pressure orifice plate which is arranged in the said discharge line or branch, in order that the pressure which acts on the control piston end side is sufficiently high, in order, for example, to bring about the desired load response of the hydrostatic drive. In addition to the said back-pressure orifice plate, an orifice plate can be provided in the control line in order to reduce the servo pressure which prevails in the connecting line which is arranged between the control cylinder and the servo cylinder, in order that the returned servo pressure which acts on the passive end side of the control piston is not too high, or in order that not too much hydraulic liquid is fed to the hydraulic fluid collecting region via the control line. For the respective performance class or the provided use of the hydraulic machine, a suitable adaptation of the back-pressure orifice plate, with a possibly pressure-dependent variable cross section, and an adjustable throttle or orifice plate in the control line will suitably be provided, in order to achieve an optimum method of operation of the hydraulic machine. Here, both the back-pressure orifice plate in the branch and the throttle orifice plate in the control line will suitably be selected to be adjustable, in order for it thus to be possible to cover a greater range of use for the adjusting device according to the invention for a hydraulic machine. The said throttles or orifice plates are preferably temperature-independent, that is to say their resistance remains constant in the case of changing temperatures.

If a line to a hydraulic fluid collecting region, for example to a hydraulic fluid tank, is branched off from the control line, a back-pressure orifice plate is to be provided in the said branch, in order that not too much hydraulic liquid is discharged from the servo chambers into the tank, and/or that a hydraulic short-circuit is not produced between the hydraulic fluid collecting region and the servo chambers. A throttle orifice plate for pressure reduction can be arranged to this end both upstream of the load response valve and downstream of the load response valve or downstream of the branch in the control line.

The orifice plates or throttles addressed above can also be dispensed with completely, however, and the pressure from the active servo chamber can be returned directly to the passive side of the control piston. It is to be noted here that the area which is then active for an adaptation of the load response is correspondingly dimensioned in terms of its size. However, as soon as a branch with a discharge line to a hydraulic fluid collecting region is provided, in order that hydraulic fluid can be discharged from the active servo chamber, a back-pressure orifice plate is likewise to be provided in the said discharge line in order to avoid a hydraulic short-circuit. In this case, depending on the design of the control line, the throttle orifice plate in the control line can be dispensed with, or an adjustable orifice plate of this type can be assumed by the control slide in interaction with the valve slide of the load response valve.

Here, it is irrelevant for the adjusting device according to the invention whether the control piston which is used exhibits a positive or negative overlap with its control edges and the control edges of the control cylinder. It is likewise irrelevant for the adjusting unit according to the invention whether the hydraulic machine which is to be adjusted by way of the adjusting unit according to the invention is operated in an open or closed hydraulic liquid circuit. It is likewise irrelevant for the adjusting unit according to the invention whether it is used in a hydraulic pump, hydraulic motor or some other hydrostatic drive. Adjusting units which already exist can be retrofitted or modified according to the invention by way of the particularly preferred integrated embodiment of the load response valve within the control piston. In many cases, merely the control piston has to be exchanged here for a control piston with load response valves which are received therein.

It has been assumed during the course of the above description of the invention that the control piston is moved in a manner which is loaded with pressure force via proportional magnets, which does not necessarily have to be the case, however. The concept of the invention includes all other actuating apparatuses for control pistons which are known in the prior art.

The invention makes it possible to change as desired between load-flexible and load-rigid operation by way of only one hydrostatic adjusting unit or to set its load-flexibility as required, preferably in an infinitely variable manner. To this end, no additional actuators are required in one preferred embodiment and a sensor system for detecting the position or for determining the operating pressure can be dispensed with as far as possible. Further preferably, load dependence during driving operation and at the same time load independence in the braking mode or overrun mode or retardation mode can be achieved. In addition, the load dependence can be configured differently in both operating directions. The adjusting unit according to the invention preferably uses a customary mechanical return chain in both methods of operation, including a return spring, for the proportional adjustment of the delivery volume or displacement of the hydraulic machine. A further effect of the configuration according to the invention is the automatic swivel-ling back of the pump in the case of a component failure of the mechanical return chain. A further advantage of the invention consists in that a wide variety of hydraulic machines of different delivery volumes can be covered by way of the hydrostatic adjusting device, it being possible for one and the same adjusting device to be used, for example, for all models of a hydraulic machine range.

The invention will be explained in greater detail in the following text using exemplary embodiments which are shown in the figures and do not restrict the concept of the invention. In the figures:

BRIEF DESCRIPTION OF THE DRAWINGS

FIG. 5 shows a detailed view of a control unit according to the invention in a second operating state, in section.

DETAILED DESCRIPTION OF THE PREFERRED EMBODIMENTS

Figure 1:
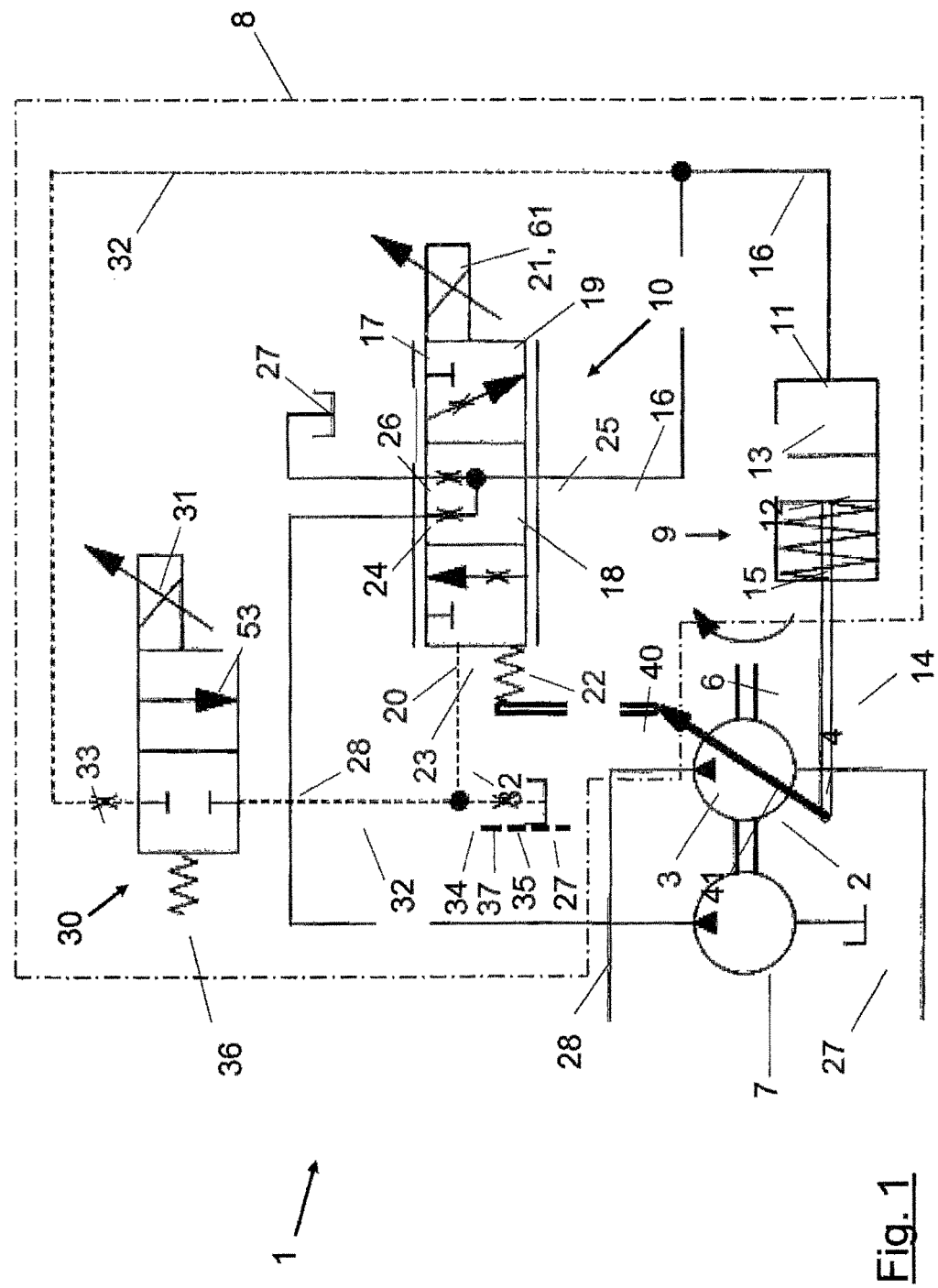
FIG. 1 shows a first exemplary embodiment of a hydrostatic adjusting device according to the invention in a diagrammatic illustration.

FIG. 1 shows a hydraulic pump, by way of example, for a hydraulic machine 1 with a hydrostatic adjusting device 8 according to the invention according to a first exemplary embodiment in a diagrammatic view, the dash-dotted line symbolizing the adjusting device 8 according to the invention. The hydraulic machine 1 which is shown diagrammatically and purely by way of example has a variable displacement pump 2 with an outlet 3 and an inlet 4 which are connected via a hydraulic circuit to a consumer (not shown). In this simplified example, the variable displacement pump 2 delivers only in one direction and can have its delivery quantity controlled via a controller (not shown) which acts on the hydrostatic adjusting device 8. In the case of an axial piston machine, for example, the adjustment of the delivery quantity takes place by means of a swash plate or bent axis as adjusting element 41 via a change in the angular position of the swash plate or bent axis. The variable displacement pump 2 is driven via the drive shaft 6 by a drive (not shown), preferably an internal combustion engine or electric motor. The drive shaft 6 also drives a feed pump 7 which supplies the adjusting device 8 with hydraulic fluid under control pressure via a feed line 28 in an open circuit. The feed pump 7 receives the pressure fluid from a hydraulic fluid collecting region, for example from a tank 27 of the hydraulic machine 1, in which tank 27 discharge pressure usually prevails.

In FIG. 1 and in all further figures, "tank 27" generally symbolizes a hydraulic fluid collecting region of the hydraulic machine 1, independently of how the said hydraulic fluid collecting region is configured in detail and how precisely the different line paths for the compressed fluid are guided to it. Here, the tank 27 can also assume a part volume of the housing of the hydraulic machine 1, the pressure level in the housing frequently not corresponding to ambient pressure and often lying above it. The feed pump 7 delivers hydraulic liquid via a hydraulic feed line 28 to the adjusting device 8 of the variable displacement pump 2.

The hydraulic adjusting device 8 according to the invention has a servo adjusting unit 9 and a control unit 10 which are connected to one another via a hydraulic connecting line 16. The control unit 10 has a control cylinder 17, in which a control piston 18 is mounted longitudinally displaceably. An actuator 21 acts on a first end side 19 of the control piston 18, which actuator 21 is configured, for example, as a proportional magnet 61 and is actuated with a current of preselected level by the, for example electric, controller (not shown) for the adjusting device 8. A connector 23 for pressure fluid from a control line 32 which leads from the connecting line 16 to the second end side 20 of the control piston 18 is provided on that second end side 20 of the control piston or control slide 18 which lies opposite the first end side 19. Furthermore, instead of a conventional return apparatus (for example, according to DE 10 2004 033 376 B3), a return spring 22 which serves to generate a restoring force for the control slide 18 acts on the second end side 20 of the control piston 18. Here, the restoring force of the return spring 22 is directed counter to the force of the actuator 21 and is in equilibrium with the actuator force in the neutral position or starting position of the control slide 18 in the control cylinder 17.

Furthermore, the control cylinder 17 has an inlet 24 for the pressure fluid under control pressure which is guided in via the feed line 28. Furthermore, the control cylinder 17 has a servo connector 25 for the connecting line 16 to the servo adjusting unit 9 and an outlet 26 which leads by a line to the hydraulic fluid collecting region 27. The control cylinder 17 is provided with a plurality of ducts which, in a manner which is controlled via control edges of the control cylinder 17 and via control edges of the control piston 18, depending on the position of the control piston 18 in the control cylinder 17, lead the hydraulic fluid which is pressurized by the feed pump 7 via the connecting line 16 to the servo chamber 13 of the servo adjusting unit 9 or release the discharge of hydraulic fluid out of the servo chamber 13 via the outlet 26 to the tank 27. The middle region (in FIG. 1) of the control piston 18 exhibits by way of example a negative overlap of the control edges of the control piston 18 with the control edges of the control cylinder 17, which is indicated in FIG. 1 by way of orifice plate symbols.

The servo adjusting unit 9 has a servo cylinder 11, in which a servo piston 12 is arranged longitudinally displaceably with the formation of a servo chamber 13. That side of the servo piston 12 which faces away from the servo chamber 13 is provided with a transmission member 14 which is coupled to an adjusting element 41 of the variable displacement pump 2. A servo spring 15 counteracts the pressure of the hydraulic fluid in the servo chamber 13. The servo chamber 13 of the servo cylinder 11 is supplied with hydraulic liquid via the connecting line 16 which is connected via the servo connector 25 to the control unit 10. Furthermore, the connecting line 16 serves to discharge pressure fluid from the servo chamber 13 into the hydraulic liquid collecting region 27 or into the tank 27, according to the respective position of the control piston 18 in the control cylinder 17, or the position of the respective control edges 38, 39 (cf. FIGS. 4 and 5) with respect to one another.

According to the invention, a control line 32 branches from the connecting line 16, which control line 32 can be opened and closed by a load response valve 30. In the exemplary embodiment which is shown in FIG. 1, the load response valve 30 is arranged separately from the control unit 10 and is configured by way of example in the form of a 2/2-way valve. The control line 32 is connected hydraulically to that connector 23 of the control cylinder 17 which is arranged on the second end side 20 of the control piston 18 when the load response valve 30 is opened. In this exemplary embodiment, the load response valve 30 is provided with an actuator 31 which is used as a valve actuating apparatus and can transfer the load response valve 30 counter to a valve spring 36 from the closed position which is shown in FIG. 1 into an open position (not shown). Depending on the actuation, the actuator 31 pushes a valve slide 53 from a first position, in which the load response valve 30 closes the control line 32, into a second position, in which the load response valve 30 opens the control line 32. Here, the closed position (shown in FIG. 1) of the load response valve 30 corresponds to a load-rigid method of operation of the hydraulic machine 1. An open position of the load response valve 30 corresponds to a load-flexible method of operation of the hydraulic machine 1.

In the exemplary embodiment which is shown in FIG. 1, a throttle 33 is arranged in the control line 32 upstream of the load response valve 30 in the flow direction, which throttle 33 can also be arranged in the control line 32 downstream of the load response valve 30 in the flow direction, however. Furthermore, a discharge line 37 from the control line 32 is arranged on a branch 34 downstream of the load response valve 30 in the flow direction, which discharge line 37 discharges hydraulic liquid via a back-pressure orifice plate 35 to the hydraulic liquid collecting region 27 of the hydraulic machine, which hydraulic liquid collecting region 27 is shown diagrammatically as a tank 27. In the context of the invention, the flow direction in the control line 32 corresponds to the return direction of hydraulic liquid from the connecting line 16 via the load response valve 30 to the control device 10 or to the hydraulic liquid collecting region 27.

Figure 2:
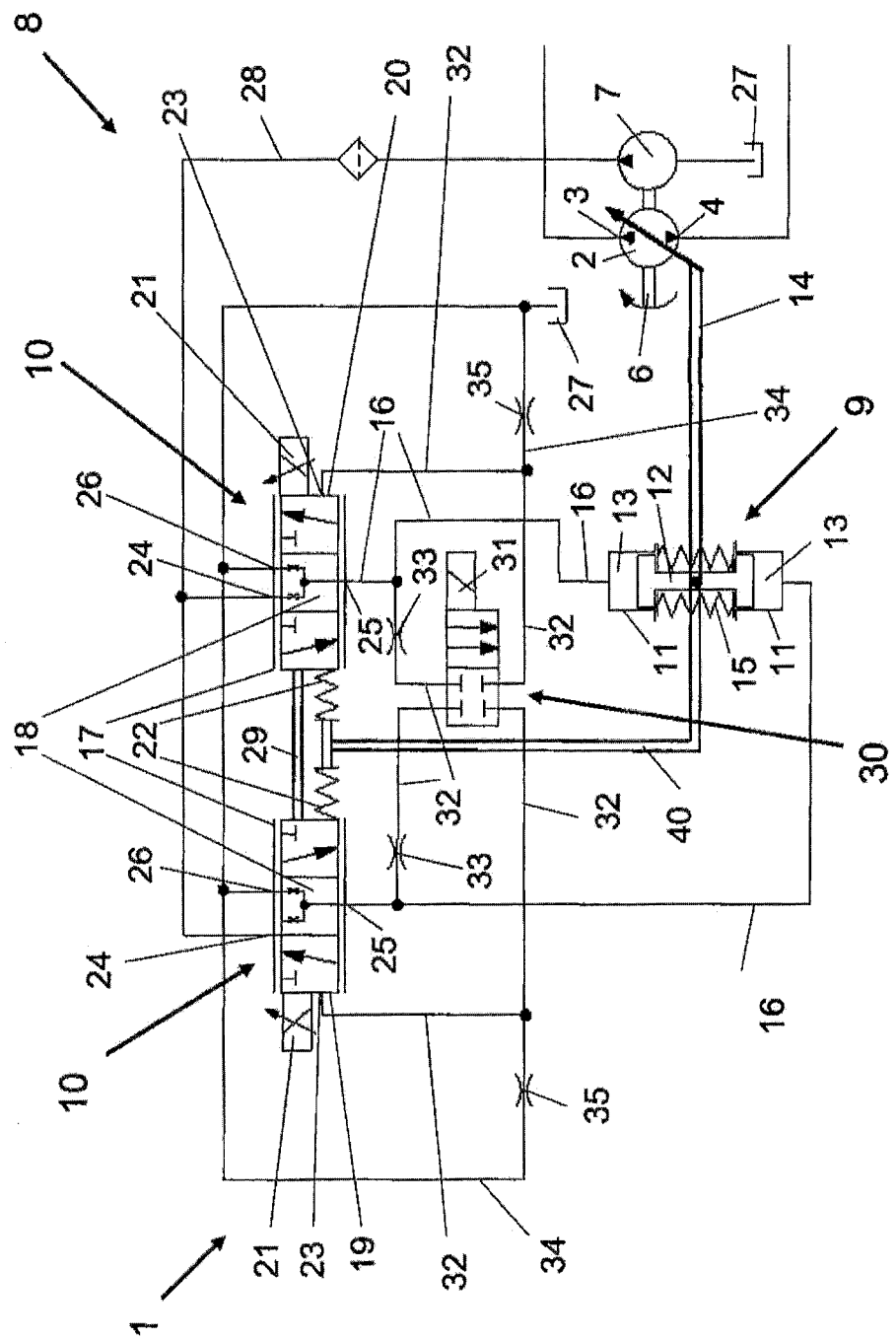
FIG. 2 shows a second exemplary embodiment of a hydrostatic adjusting device according to the invention in a diagrammatic illustration.

In FIG. 1, the load response valve 30 is arranged upstream of the branch 34 in the flow direction, which represents only one exemplary embodiment, however. An arrangement of the load response valve 30 in the control line 32 downstream of the branch 34 in the flow direction represents an equivalent embodiment which is particularly preferred in the case of the integration of the load response valve 30 in the control piston 18 (cf. exemplary embodiments of FIGS. 4 and 5). FIGS. 1 and 2 show the load response valves 30 in the equivalent hydraulic circuit diagrams separately from the control device 10 merely by way of example and for the purpose of clarification of the concept of the invention.

It is possible by way of the hydrostatic adjusting device 8 according to the invention to use the hydraulic machine 1 as desired in two different methods of operation, load-rigid or load-flexible. In a first method of operation, the load response valve 30 which is configured as a directional valve is in the shut-off position, which can be brought about, for example, by way of corresponding deactivation of the actuator 31 via the valve spring 36 of the load response valve 30, as shown by way of example in FIG. 1. In the case of an inactive actuator 31, the valve spring 36 of the load response valve 30 presses the slide 53 into the closed valve position. This means that no hydraulic liquid is guided via the control line 32 onto the second end side 20 of the control piston 18. Only the actuator 21 and the control piston return spring 22 which counteracts it therefore act on the control piston 18. The hydraulic liquid pressure which acts on the servo piston 12 of the servo adjusting unit 9 in the servo chamber 13 is therefore determined solely by way of the interaction of the forces on the control piston which are exerted by the actuator 21 and the return spring 22. However, the magnitude of the pressure level in the servo chamber 13 of the servo adjusting unit 9 has no appreciable influence on the force equilibrium on the control piston 18. In this operating type, the load dependence of the variable displacement pump 2 is suppressed. The position of the servo piston 12 in the servo adjusting unit 9 and therefore the swiveling angle of the adjusting element 41 of the variable displacement pump 2 are determined by way of the control signal which acts on the actuator 21. There is no load dependence of the variable displacement pump 2, that is to say pressure fluctuations in the servo chamber 13 of the servo adjusting unit 9 which are caused by external load changes in the working circuit of the variable displacement pump 2 are not returned hydraulically to the control unit 10 by the control line 32, since the load response valve 30 and therefore the control line 32 are closed. The system which is shown in FIG. 1 is therefore in a load-rigid operating state.

In a second, load-flexible method of operation of the hydrostatic adjusting device 8 according to the invention, the load response valve 30 is switched to allow passage by way of actuation of the actuator 31 which presses the slide 53 counter to the spring force of the valve spring 36 into the open position of the load response valve 30, it not being absolutely necessary here for the maximum passage cross section to be completely open. Although FIG. 1 does not show this load-flexible state of the hydraulic machine 1, the following comments can be readily comprehended using FIG. 1. If the load response valve 30 is opened, pressure fluid which is under servo pressure in the connecting line 16 can act via the control line 32 on the second end side 20 of the control piston 18. For example, the magnitude of the pressure in the control line 32 at that connector 23 of the control cylinder 17 which is arranged adjacently with respect to the second end side 20 of the control piston 18 is reduced in comparison with the hydraulic pressure in the connecting line 16 and the pressure which prevails in the servo chamber 13, since, for example, a throttle 33 is arranged in the control line 32 upstream or downstream of the load response valve 30 and a back-pressure orifice plate 35 is arranged in the discharge line 37. Furthermore, the throttle 33 can be realized, for example, in the form of a nozzle or orifice plate. Pressurized hydraulic fluid from the control line 32 is therefore present at the connector 23 and acts on the second end face 20 of the control piston 18, with the result that a force is generated which is directed counter to that of the control piston actuator 21. The magnitude of this force depends on the pressure which prevails in the servo chamber 13 and in the connecting line 16 and the orifice plates 33 and 35 which are possibly arranged in the control line 32 and in the discharge line 37. It is generally true, in the case of an unchanged orifice plate cross section of the throttle 33, that the higher the pressure in the connecting line 16, that is to say the higher the delivery pressure of the variable displacement pump 2, the higher the pressure at the connector 23 and therefore the force which acts counter to the actuator 21. As a consequence, the force action on the second end side 20 of the control piston 18 brings about a retraction of the swiveling-out of the adjusting element 41 in the case of a rising external load on the hydraulic machine. The control piston 18 is displaced by way of the pressure force increase on the second control piston end side 20 in such a way that a reduction of the servo pressure in the servo chamber 13 of the servo adjusting unit 9 is possible. In the case of increased loading of the hydraulic machine 1, the delivery quantity of the variable displacement pump 2 is thus reduced automatically, the delivery pressure at the outlet 3 rising in the case of a constant drive output at the drive shaft 6.

In other words: if the current supply of the actuator 21 and therefore its force on the control piston 18 are not changed in the case of a load increase on the hydraulic machine 1, first of all the delivery pressure at the outlet 3 of the hydraulic machine 1 rises as the external load increases, as a result of which the pressure in the servo adjusting unit 9 rises. Therefore, the pressure in the connecting line 16 and in the control line 32 also rises, and therefore the pressure force on the second control piston end side 20 rises. As a result of the rising pressure force, the control piston 18 is displaced counter to the actuator force of the actuator 21 in interaction with the force of the control piston return spring 22, with the result that the pressure level in the connecting line 16 which leads to the servo adjusting means 9 drops as a result of discharge to the tank via the connector 26. Therefore, the servo piston return spring 15 can displace the servo piston 12 in the servo cylinder 17 in the direction of the zero position or neutral position, which results in the swiveling back of the adjusting element 41. The delivery volume of the variable displacement pump 2 drops. However, the pressure decrease in the servo chamber 13 once again results in a pressure decrease in the control line 32, as a result of which the pressure force which is caused by way of it on the second control piston end side 20 drops and the control piston 18 is pushed by the actuator 21 in the direction of its neutral position. In the load-flexible method of operation of the hydraulic machine 1 with an adjusting unit 8 according to the invention, the position of the control piston 18 is therefore determined by way of the spring force of the position return spring 22, the identically directed pressure force on the second end face 20 of the control piston 18, and the actuator force of the actuator 21 which counteracts the said forces on the first end side 19 of the control piston 18.

The operations which are described for the above exemplary embodiment in the case of an increase in the external load analogously trigger a delivery volume increase of the hydraulic machine in the case of a load decrease on the working circuit of the variable displacement pump 2, if the load response valve 30 is opened. If the pressure in the servo chamber 13 drops, the pressure in the control line 32 also drops, as a result of which the pressure force on the second control piston end side 20 drops and the actuator 21 moves the control piston 18 in the direction of an increase in the servo pressure in the connecting line 16, until the force of the spring 22 of the position return device 40 together with the pressure force on the second end side 20 of the control piston 18 is in equilibrium with the actuator force. A pressure increase in the servo chamber 13 analogously means an adjustment of the adjusting element 41 of the variable displacement pump 2 in the direction of a greater delivery volume of the hydraulic machine. As the servo pressure increases, the hydraulic liquid pressure in the control line 32 and therefore, if the load response valve 30 is opened, the pressure force on the second end side 20 of the control piston 18 also rises, which moves the said control piston 18 again in the direction of its starting position. An open load response valve 30 therefore brings about an adaptation of the delivery volume of the variable displacement pump 2 both in the case of an increase in the external load, for example at the start of uphill driving, and in the case of a reduction in the load, for example at the start of downhill driving.

Specifically in the case of downhill driving, however, a load-flexible response of the variable displacement pump 2 is not desired, since then the retardation effect of the drive machine of the variable displacement pump 2 is reduced. A hydrostatic propulsion drive usually passes during downhill driving into an overrun mode, which means that the hydraulic motor begins to deliver hydraulic liquid in the direction of the hydraulic pump which for its part then acts as a "hydraulic motor". In the case of downhill driving, however, the maximum available supporting torque of the drive motor is preferably to be used as far as possible for retardation. In the retarding overrun mode, the hydrostatic drive is not to exhibit any load-variable response, but rather is to be load-rigid. Load-rigid also means that the delivery volume or displacement, for example of the hydraulic pump 2 in FIG. 1 which acts as a hydraulic motor in the overrun mode, is not to become greater, since otherwise, for example, the vehicle speed would increase. The pump which acts as a motor in the overrun mode would tend in the direction of a greater swept volume in the case of a load-flexible setting of the adjusting unit according to the invention, and would thus yield to the supporting torque of the drive motor. However, stability of the vehicle speed is desired in most applications, which can be realized only by way of an adjusting device which is set to be load-rigid. Only then can the hydrostatic drive be supported on the drive machine, for example a diesel engine.

According to the invention, a load-flexible response of the variable displacement pump 2 of this type as described above can be transferred into a load-rigid operating response of the variable displacement pump 2 by way of simple closure of the load response valve 30. A feedback of the hydraulic liquid pressure in the servo chamber 13 to the second end side 20 of the control piston 18 is then suppressed. The position of the control piston 18 in the control cylinder 17 is determined solely by way of the force of the control actuator 21 and the restoring force from the position return means 40 or the return spring 22. A decrease in the servo pressure in the overrun mode of the hydrostatic drive therefore has no effect on the position of the servo piston 12 in the servo cylinder 11, whereby the adjusting element 41 which is connected to the servo piston 12 cannot move in its deflection. The delivery volume or displacement of the variable displacement pump 2 remains at the set value.

The pressure which prevails in the control line 32 in load-flexible operation of the hydraulic machine 1 can preferably be backed up in a controlled or adjustable manner via a back-pressure orifice plate 35 which is arranged in the discharge line 37 which leads to the tank 27. This back-pressure acts on the control piston 18, independently of whether the branch 34 or the discharge line 37 is arranged downstream or upstream of the load response valve 30 in the flow direction. Therefore, in a further embodiment of the adjusting device 8 according to the invention, the degree of load dependence of the hydraulic machine 1, if the load response valve 30 is opened, can be set by way of the dimensioning of the throttle 33 and the back-pressure orifice plate 35. Here, the throttle 33 in the control line 32 upstream of the connector 23 should preferably have a smaller diameter than the back-pressure orifice plate 35 in the discharge line 37 to the hydraulic liquid collecting region 27.

In another refinement of the invention, the throttle 33 and/or the back-pressure orifice plate 35 are/is of adjustable configuration, with the result that use-induced load dependence of the hydraulic machine 1 can be set during operation of the hydraulic machine 1. Thus, for example, the torque, with which a hydrostatic drive which is in overrun mode is supported on the drive machine, can be regulated, which is preferable possibly in the case of slight downhill slopes, in order to keep the speed of the hydrostatic drive constant, if the retardation torque of the drive motor is greater than the slope-induced drive torque on the hydrostatic drive. The supporting torque of the hydrostatic drive in the overrun mode on the drive motor decreases if the operating response of the adjusting device 8 according to the invention is set to be load-flexible, and at the same time the delivery volume of the hydrostatic drive and therefore, for example, the driving speed increase. If the adjusting device 8 according to the invention is switched from load-flexible to load-rigid, by the load response valve 30 being closed, the supporting torque and therefore the delivery volume remain at a virtually constant level. Renewed (controlled) opening and subsequent closure of the load response valve 30 in the overrun mode can be used to lower the supporting torque, in order thus, for example, to control the automotive response of a hydrostatic drive.

In summary, it can be said that load-flexible control of the adjusting device 8 which can be selected by way of opening of the control line 32 achieves a situation where load changes on the variable displacement pump 2 are compensated for automatically. This is expressed in the fact that the power consumption of the variable displacement pump 2 is kept virtually constant in the case of an increase in the load by way of a reduction of the delivery quantity according to the increase in delivery pressure, without an operator having an effect on this. Thus, for example, in the case of a work machine with a hydrostatic propulsion drive which changes from driving at a constant speed on level ground to uphill driving, the driving speed is adapted automatically and thus the uphill slope is overcome at a reduced speed. In the above-described application, in contrast, the result in the case of load-rigid operation of the same hydrostatic drive (closed control line 32) would be that the pressure change induced by way of the uphill slope at the outlet 3 of the variable displacement pump 2 has no influence on the balance of forces and therefore on the position of the control piston 18 in the control cylinder 17, and the vehicle can drive along the uphill slope at an approximately identical speed if the performance reserves of the drive motor allow this.

The adjusting device 8 according to the invention allows a selection to be made between load-flexible and load-rigid operation of the hydraulic machine as desired or in a manner which is adapted to external requirements. For this purpose, merely the load response valve 30 in the control line 32 has to be opened or closed, which can take place, for example, manually or by, for example, electromechanical actuators.

All the reference numerals which are used in FIG. 1 will also be retained in the following figures in order to denote identical structural features.

FIG. 2 shows a second, preferred exemplary embodiment of a hydrostatic adjusting device 8 according to the invention in a diagrammatic illustration. In contrast to the exemplary embodiment which is shown in FIG. 1, the variable displacement pump 2 is designed for two delivery directions, it being possible for the delivery volume to be set preferably in an infinitely variable manner. Here, the servo adjusting unit 9 has a double servo piston 12 which is guided slidingly in a servo cylinder 11 with two servo chambers 13. The two servo chambers 13 are connected to the control unit 10 in each case by way of a dedicated connecting line 16. The control unit 10 has two control pistons 18 which are arranged longitudinally displaceably in associated control cylinders 17. In this illustration which serves merely for clarification, the two control pistons 18 are coupled rigidly via a connecting element 29. In practice, the two control pistons 18, combined as a single-piece component, can be mounted in a likewise single-piece control cylinder 17, cf. FIGS. 4 and 5 in this regard. Each of the outer end sides 19, 20 of the two control pistons 18 can be loaded with force by an associated actuator 21, the two actuators 21 acting in opposite directions. As has already been described in the exemplary embodiment according to FIG. 1, each of the two sides of the control cylinder 17 has an inlet 24 for the pressurized hydraulic fluid which is made available by the feed pump 7 via the feed line 28. Furthermore, in each case one connecting line 16 leads from the servo connector 25 of the respective side of the control cylinder 17 to in each case one of the two servo chambers 13 of the servo adjusting unit 9. In each case one control line 32 branches off from each connecting line 16, which control line 32, in accordance with the exemplary embodiment from FIG. 1, leads via an optionally arranged throttle 33 to a common load response valve 30. From there, the two control lines 32 lead to in each case one connector 23, which connectors 23 are arranged in each case on one of the sides of the control cylinder 17 in an adjacent manner to the two end sides 19, 20 of the control pistons 18 which are arranged on the outside. The load response valve 30 which is common to both control lines 32 is configured with two passages and two shut-off means in the manner of a 4/2-way valve. The two control lines 32 can thus be opened or closed at the same time, with the result that the same load-rigid or load-flexible operating response can be switched for both delivery directions of the hydraulic machine 1 by way of only one load response valve 30, for example via a load response actuator 31.

A position return device 40 which, in conjunction with two return springs 22, acts on the control piston 18 moves the control piston 18 into its starting position after a displacement of the control piston 18 by way of one of the two actuators 21, when the desired deflection is achieved at the variable displacement pump 2. The position return means 40 is also provided for the purpose of setting the delivery quantity of the variable displacement pump 2 to the value "zero" if the controller (not shown) of the hydraulic machine 1 stipulates a neutral position, in which the two actuators 21 are inactive or de-energized. The functional principle of the adjusting device 8 according to the invention according to FIG. 2 corresponds analogously here to the functional principle, as depicted with respect to FIG. 1, with the stipulation that the hydraulic machine 1 can be deflected in two directions and thus, for example, a switchable load-flexible or load-rigid response can be realized for both driving directions of a hydrostatic drive.

Figure 3:
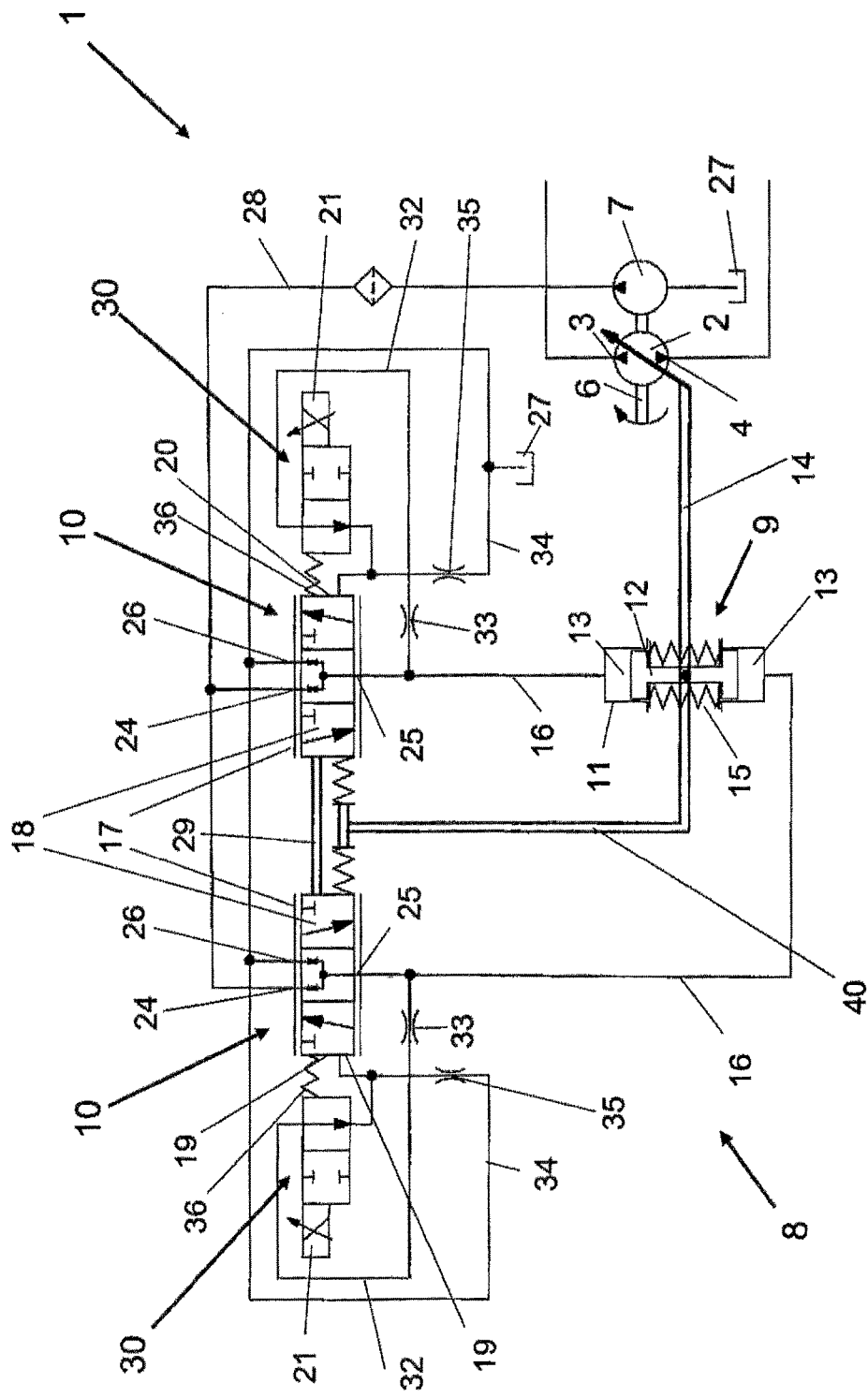
FIG. 3 shows one modification of the exemplary embodiment according to FIG. 2.

FIG. 3 shows a further preferred exemplary embodiment of a hydrostatic adjusting device 8 according to the invention in a diagrammatic illustration. A structural modification of the adjusting device 8 (shown in FIG. 2) of a hydraulic machine 1 with two delivery directions is shown. In this design, each of the two sides of the control piston 18 is assigned a dedicated load response valve 30 which is integrated, for example, into the respective ends of the control piston 18 and which can be actuated by way of the control piston actuators 21. Here, the actuators 21 act on the deflected slides 53 of the load response valves 30 and, in the case of their activation, first of all actuate the load response valve 30 from the open position into the closed position, before the associated control piston 18 is moved, for example by positioning of the slide 53 onto the associated end face 19 or 20 of the control piston. An embodiment, in which a plunger 62 of a proportional magnet 61, after closure of the load response valve 30, comes into contact with a cover 59 which is configured on the control piston 18, and via which plunger 62 the control piston 18 is moved, is likewise included here in the concept of the invention, like other structural embodiments for the indirect movement of the control piston 18 (in this regard, cf. also FIGS. 4 and 5). The remaining details and the method of operation of the exemplary embodiment of the invention shown in FIG. 3 correspond to those embodiments of an adjusting unit 8 according to the invention of a hydraulic machine 1 which were described using FIGS. 1 and 2.

The arrangement according to FIG. 3 achieves a situation where the active side of the control unit 10, that side, on which the actuator 21 displaces the control piston 18 in order to stipulate an adjustment of the hydraulic machine 1, is switched to load-rigid for the controlled positioning of the control piston 18, and a load-flexible or load-rigid response of the hydraulic machine can be set as required on the opposite, passive side of the control unit 10 by way of suitable actuation of the actuator 21 there. Here, the embodiment (shown in FIG. 3) of the adjusting device 8 according to the invention is constructed in such a way that that connecting line 16 which leads from the passive side of the control unit 10 to the servo adjusting means 9 supplies the servo adjusting means 9 actively with pressurized hydraulic liquid from the feed line 28, depending on how greatly the actuator 21 on the active side of the control unit 10 deflects the control piston 18. If the actuator 21 on the passive side of the control unit 10 remains de-energized, that is to say inactive, the hydraulic machine 1 (shown in FIG. 3) on this side has a load-flexible operating response, since the load response valve 30 on the passive side of the control unit 10 remains in the open position. However, the concept of the invention also includes a closed position of the load response valve 30 in the case of an inactive actuator 21 on the passive side of the control unit 10, whereby the hydraulic machine 1 would then be set to load-rigid.

If only a change in the operating response of the hydraulic machine 1 is to take place, the actuator 21 on the passive side of the control unit 10 can displace the slide 53 of the load response valve 30 which is assigned to it only to such an extent, optionally with low force, that the load response valve 30 is transferred into its closed position (load-rigid operation of the hydraulic machine 1) and, as a result, the control piston 18 is substantially not influenced in its relative position in the control cylinder 17. The embodiment which is shown in FIG. 3 therefore achieves a situation where the switchability according to the invention of the operating mode of a hydraulic machine 1 can be performed by way of the same actuators 21 which are already provided in any case for controlling the hydraulic machine 1. Further actuators are not necessary, in order to implement the concept of the invention.

Figure 4:
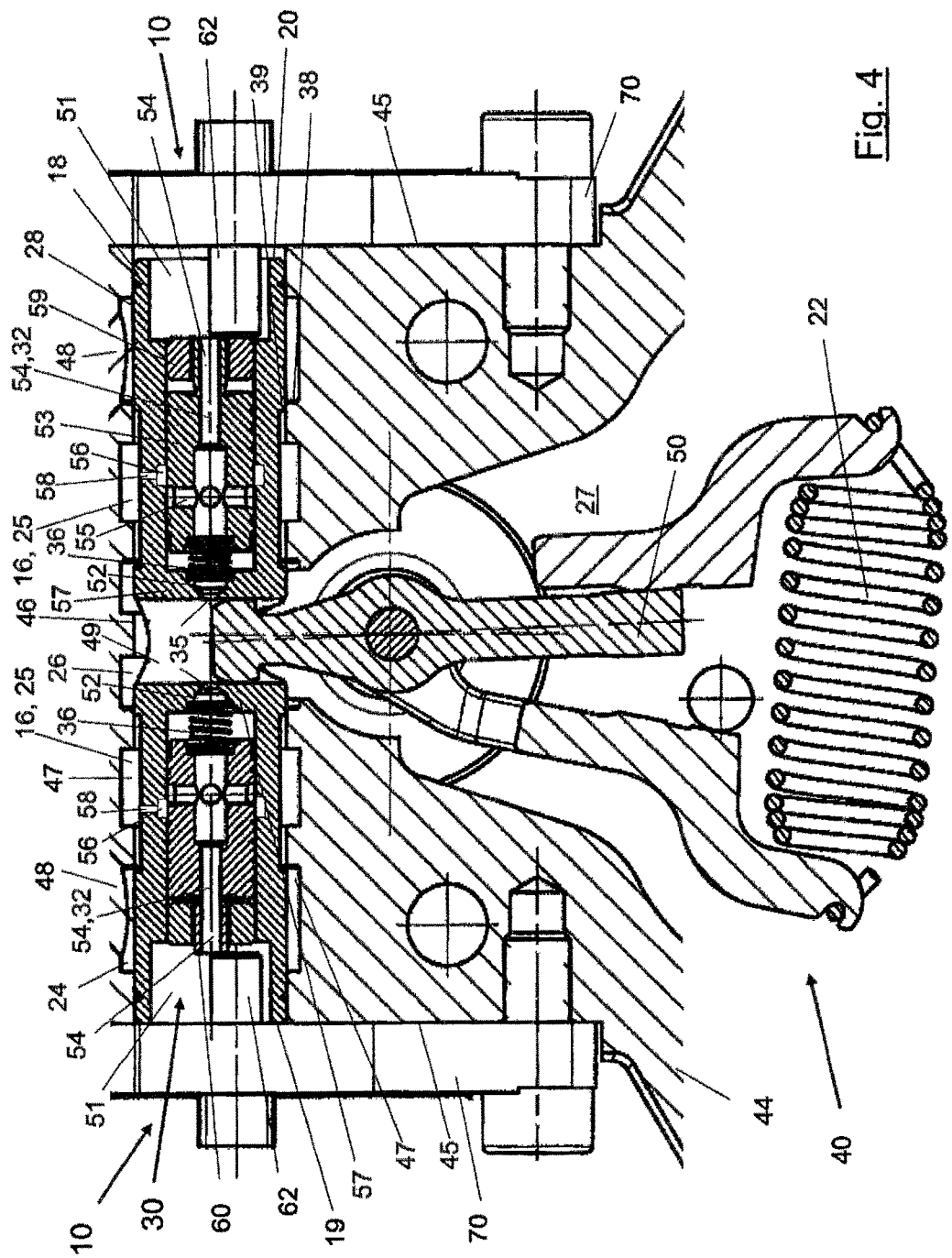
FIG. 4 shows a detailed view of a control unit according to the invention in a first operating state, in section.

FIGS. 4 and 5 show an exemplary structural embodiment of one preferred design according to FIG. 3. FIG. 4 shows a detailed view of a control unit 10 according to the exemplary embodiment of the invention proposed in FIG. 3 in a first operating state in section. Reference is made to the explanations with respect to FIG. 3 with regard to the general details. The control unit 10 is part of a hydraulic machine 1 which can be adjusted, for example, in an infinitely variable manner and can deliver pressure fluid in a closed circuit in two directions. For reasons of clarity, not all details are provided with reference numerals in this FIG. 4 and in FIG. 5. With regard to the largely symmetrical construction, some reference numerals are inscribed only once, although there are two identical elements. However, all reference numerals are added which are necessary for explaining the details which are considered to be necessary, reference numerals for components which have already been described in FIGS. 1 to 3 having been retained. It goes without saying that a person skilled in the art recognizes that, for example, "control edge 38" means all control edges of the control cylinder 17, although only some of them are marked with the reference numeral "38" in the figures. This applies analogously to the control edges 39 of the control piston 18.

A continuous transverse bore 46 which forms the control cylinder 17 is arranged in the housing 44 of the hydrostatic adjusting device 8 between two side faces 45. The transverse bore 46 has a plurality of circumferential grooves, the lateral, axial boundaries of which form control edges 38 and are connected hydraulically to the various pressure regions of the hydraulic machine 1. As can be seen from FIG. 4, there are a plurality of control edges 38. The inlets 24 of the inlet ducts 48 open into the control cylinder 17 at the respectively outer end of the control cylinder 17. Via the inlets 24, the hydraulic liquid can be guided under feed pressure from the feed line 28 to the control unit 10. The servo connectors 25, adjacent with respect hereto, for the connecting line 16 can guide the pressure fluid which is fed in by the feed line 28 further to the servo adjusting unit 9 if the relative position of the control edges 38 of the control cylinder 17 and the control edges 39 of the control piston 18 allow this.

Two control pistons 18 which are combined here to form a single-piece component are arranged longitudinally displaceably in the control cylinder 17. The symmetrical component which is formed as a result (called control piston 18 in the following text) is coupled in a middle, constricted centre region 49 to a lever 50 which is part of a position return device 40. Via a transverse bore 46 in the control cylinder 17, the outlets 26 of the control cylinder 17 are connected hydraulically to the outlet pressure region, that is to say to the hydraulic liquid collecting region 27 of the hydraulic machine 1, if this is possible on account of the position of the control piston 18 in the control cylinder 17 or the position of the control edges 38, 39. The method of operation of a controller of this type, in particular the interaction of the control edges 38 of the control cylinder 17 with the control edges 39 of the control piston 18, is known to a person skilled in the art and will therefore not be explained further here.

The symmetrically designed control piston 18 is provided on each side with a blind bore 51, in which in each case one slide 53 of a load response valve 30 is mounted longitudinally displaceably. The blind bore 51 which is, for example, of stepped configuration reaches approximately as far as the centre region 49. On its region which adjoins the centre region 49, it has a discharge line bore 52 which opens into the centre region 49 and is part of the branch 34. The discharge line bore 52 is preferably configured in such a way that it at the same time performs the function of the back-pressure orifice plate 35. Via the said back-pressure orifice plate 35, pressure fluid can flow out of the load response valve 30 via the centre region 49 to a hydraulic liquid collecting region, for example to a tank 27 (not shown).

The slide 53 of the load response valve 30 is provided with a continuous longitudinal bore 54, from which a continuous transverse bore 55 branches. The said transverse bore 55 can be brought into overlap with an annular groove 56 which is configured in the stepped blind bore 51 in the control piston 18. The annular groove 56 is connected via a duct 58 in the control piston 18 to the connecting line 16 or via the servo connector 25 to the servo chamber 13. The control line 32 (cf. FIGS. 1 to 3) is formed in this exemplary embodiment by the duct 58, the annular groove 56, the transverse bore 55 and the longitudinal bore 54 in the slide 53, the discharge line 37 (cf. FIGS. 1 to 3) being formed by the discharge line bore 52 in the bottom 57 of the blind bore 51 in the servo piston 18 and the centrally arranged part of the longitudinal bore 54. As a result of an embodiment of this type, the load response valve or valves 30 can be integrated, for example, into the servo piston 18.

That side of the slides 53 which faces the centre region 49 is supported in each case by means of a valve spring 36 against the bottom 57 of the blind bore 51. The opposite end side of the slide 53 is provided with a preferably cylindrical projection 60 which is mounted longitudinally displaceably in a cover 59 which is fixed in the blind bore 51. Here, the cover 59 is configured by way of example in such a way that it firstly closes the blind bore 51 in the servo piston and secondly has an opening, through which the projection 60 of the slide 53 can protrude. The cover 59 is arranged within the blind bore 51 in such a way that the slide 53 can run through a displacement travel. If no further force is exerted on the slide 53, the valve spring 36 presses the projection 60 of the slide 53 through the cover 59, with the result that the projection 60 projects beyond the cover 59 in the longitudinal direction of the blind bore 51 (cf. left-hand side of the control apparatus according to FIG. 4). The cover 59 is fixed in the blind bore 51 relative to the control piston 18, for example by way of being pressed in or screwed in, and cannot be displaced with respect to the control piston 18.

In that operating state of the control unit 10 which is shown in FIG. 4, the control piston 18 is displaced to the left out of the approximately central neutral position under the action of force of the proportional magnet 61 which lies on the right in FIG. 4. The plunger 62 of the proportional magnet 61 on the right-hand side is advanced to such an extent that the projection 60 of the slide 53 of the load response valve 30 is recessed in the cover 59. Here, the plunger 62 of the proportional magnet 61 has displaced the slide 53 which is arranged on the right in the control piston 18 against the valve spring 36 to such an extent that the inner annular groove 56 in the control piston 18 is separated from the transverse bore 55 in the slide 53. This corresponds to a closed load response valve 30 on the right-hand side of the control unit 10. The plunger 62 of the proportional magnet 61 which is shown on the right in FIG. 4 has additionally displaced the control piston 18 to the left via contact on the cover 60 or on a shoulder in the blind bore 51. Via the ducts for pressure fluid which are opened in each case by way of the interaction of the control edges 38 and 39 of the control cylinder 17 and the control piston 18 from the feed pump 7 to the servo chamber 13 of the servo adjusting unit 9, the variable displacement pump 2 is set in a known way to a defined delivery quantity of pressure fluid. In that operating state of the hydraulic machine 1 which is shown in FIG. 4, the left-hand connecting line 16 is connected to the left-hand feed line 28. The state on the right-hand side of FIG. 4 corresponds in principle to load-rigid operation; the state on the left-hand side corresponds to load-flexible operation of the hydraulic machine 1.

In the exemplary embodiment which is shown in FIG. 4, as already in FIG. 3, the left-hand side of the control unit 10 is the active control slide, that side of the servo adjusting unit 9 which is connected to the right-hand, passive control side representing the active servo side. Here, the right-hand connecting line 16 is connected to the tank 27. The load response of the left-hand side of the control apparatus 10 can be switched from the load-flexible response which is shown into a load-flexible response via the left-hand proportional magnet 61 which is shown in FIG. 4, without the left-hand proportional magnet 61 changing the position of the control piston 18 in the control cylinder 17 in the process. Changes in the external load are therefore forwarded hydraulically via the connecting line 16 which is shown in FIG. 4 and is attached to the right-hand side of the control unit 10 at the servo connector 25.

The proportional magnet 61 on the other, left-hand side of the control unit 10 which is shown in FIG. 4 is not active. The left-side slide 53 is pressed against the cover 59 by way of the force of the valve spring 36 which is arranged on the left, and the projection 60 protrudes beyond the cover 59. As a result, the left-side annular groove 56 and the transverse bore 55 in the slide 53 are in an at least partial overlap. This corresponds to the open position of the load response valve 30, with the result that that part of the control line 32 which is formed from the elements longitudinal bore 54, transverse bore 55 and annular groove 56 is connected via the duct 58 to the active servo connector 25. Via the longitudinal bore 54, the hydraulic pressure from the active connecting line 16 can act on the first (left-hand) end side 19 of the control piston 18. The level of the load dependence can be set via the plunger 62 (shown on the left-hand side in FIG. 4) of the proportional magnet 61, by the plunger 62 acting on the projection 60 in such a way that the overlap of the transverse bore 55 and the annular groove 56 is increased or reduced correspondingly. In this way, the function of the preferably adjustable throttle 33 which was mentioned in FIGS. 1 to 3 and of the adjustable load sensitivity, that is to say the sensitivity of the load-flexibility, are provided at the same time, since the load response valves which are integrated in this way into the control pistons exhibit not only open/closed functionality, but rather open and close the passage between the annular groove 56 and the transverse bore 55 in a force-proportional manner. The further the projection 60 of the slide 53 is pressed into the control piston 18, the more load-rigid the operating response of the hydraulic machine 1. Complete load-rigidity is achieved if no more hydraulic liquid exchange is possible between the transverse bore 55 in the slide 53 and the annular groove 56 in the control piston 18. In this position, the load response valve 30 is closed. The actuator 21 on the passive side of the control unit 10 can therefore assume not only the task of switching the method of operation of the hydraulic machine 1 from load-flexible to load-rigid, but rather also of setting the degree of load-flexibility.

Mounting plates 70 are arranged on the lateral side faces 45 of the housing 44 which is shown in FIG. 4, which mounting plates 70 close the control cylinder 17 of the control unit 10 to the outside in a preferably pressure-tight manner. In each case the actuators 21 which are provided here as proportional magnets 61 with in each case one plunger 62 (for the sake of simplicity, only the plungers 62 of the proportional magnets 61 are shown) are mounted on the said mounting plates 70. The plungers 62 protrude through the mounting plates 70 and into the blind bore 51 of the associated control piston 18. The plungers 62 and the displacement travels of the proportional magnets 61 are dimensioned in such a way that the plungers 62 are in contact with the respective associated projection 60 of the slide 53 in every position of the load response valve 30. Thus, force can be exerted as required on the slide 53 at all times, first of all the load-flexible operating response being reduced upon actuation of the right-hand actuator 21/proportional magnet 61, until the load-rigidity is achieved and, upon a further increase in force on the projection 60 or a shoulder or stop on the control piston 18, the delivery volume of the hydraulic machine being influenced actively by the said actuator 21. The position of the control piston 18 in the control cylinder 17 can then be changed by the actuator 21 which is then active.

FIG. 5 shows a detailed view of a control unit 10 according to FIG. 4 in a second operating state in section. Here, the proportional magnets 61 on both sides of the control piston 18 are switched to active. However, the force which is exerted on the right-hand end side of the control piston 18 is greater than that force which is applied to the opposite side. The control piston 18 is therefore displaced to the left out of the neutral position, as has already happened in the operating state according to FIG. 4. Here, however, both slides 53 of the load response valves 30 are displaced towards the centre of the control piston by the plungers 62 of the proportional magnets 61. As a result, the connections between the respective annular grooves 56 and the transverse bores 55 in the slide 53 are closed on both sides of the control piston 18. As a consequence, the associated control lines 32 are separated hydraulically from the associated end faces 19 and 20 of the control piston 18 on both sides. As a consequence, this corresponds to a load-rigid operating state of the adjusting device 8 and therefore of the hydraulic machine 1.

What is claimed:

1. Hydrostatic adjusting device (8) of a hydraulic machine (1), the swept volume of which can be adjusted by way of a servo adjusting unit (9), having a control unit (10) which has a control cylinder (17) which has at least one inlet (24) for pressurized hydraulic fluid, at least one servo connector (25) for a connecting line (16) to the servo adjusting unit (9), and at least one outlet (26) to a hydraulic fluid collecting region (27), a control piston (18) being arranged in the control cylinder (17), which control piston (18) can be displaced by means of at least one control piston actuator (21) and has control edges (39), as a result of which, in interaction with control edges (38) which are configured in the control cylinder (17), the inlet (24) or the outlet (26) can be alternately connected hydraulically to the connecting line (16), and wherein a prevailing pressure in the connecting line (16) is returned hydraulically via a control line (32) to at least one end side (19, 20) of the control piston (18), characterized in that the control line (32) can be opened and closed by means of a load response valve (30).

2. Hydrostatic adjusting device according to claim 1, characterized in that the load response valve (30) can be actuated pneumatically, hydraulically, electrically or mechanically.

3. Hydrostatic adjusting device according to claim 1, characterized in that the load response valve (30) can be moved in a variable manner into switching positions, in which a passage for hydraulic liquid in the control line (32) is only partially open.

4. Hydrostatic adjusting device (8) according to claim 1, characterized in that the control line (32) and the load response valve (30) are integrated into the control unit (10), in particular into the control piston (18).

5. Hydrostatic adjusting device (8) according to claim 1, characterized in that, in order to actuate the load response valve (30), the at least one control piston actuator (21) acts on a slide (53) of the load response valve (30), which slide (53) is arranged within the control piston (18), the control piston actuator (21) first of all switching the load response valve (30) in the case of activation before the control piston actuator moves the control piston (18).

6. Hydrostatic adjusting device (8) according to claim 1, characterized in that a branch (34) from the control line (32) is provided in the control line (32) upstream or downstream of the load response valve (30), from which branch (34) a discharge line (37) leads to a hydraulic fluid collecting region (27) of the hydraulic machine (1), a back-pressure orifice plate (35) being arranged in the discharge line (37).

7. Hydrostatic adjusting device (8) according to claim 6, characterized in that a throttle (33) is arranged in the control line (32).

8. Hydrostatic adjusting device (8) according to claim 6, characterized in that the back-pressure orifice plate (35) and/or the throttle (33) are/is temperature-independent.

9. Hydrostatic adjusting device (8) according to claim 6, characterized in that the back-pressure orifice plate (35) and/or the throttle (33) are/is integrated into the load response valve (30).

10. Hydrostatic adjusting device (8) according to claim 6, characterized in that the back-pressure orifice plate (35) and the pressure-reducing orifice plate (33) are exchangeable and/or adjustable.

11. Hydrostatic adjusting device (8) according to claim 1, characterized in that the servo adjusting unit (8) has two servo chambers (13), and each servo chamber (13) is assigned in each case one connecting line (16) with an associated control line (32), which lead in each case to opposite end sides (19, 20) of the control piston (18).

12. Hydrostatic adjusting device (8) according to claim 11, characterized in that each end side (19, 20) of the control piston is assigned a control piston actuator (21), it being possible for each control line (32) to be opened and closed at least partially by the control piston actuator (21) which is arranged on this side independently of the other control line (32).

13. Hydrostatic adjusting device (8) according to claim 1, characterized in that the control edges (39) of the control piston (18) exhibit a positive or negative overlap with the control edges (38) of the control piston (18) in a neutral position of the said control piston (18) in the control cylinder (17).

14. Hydrostatic adjusting device (8) according to one of the preceding claims, characterized in that the control unit (10) has a position return device (40) which is coupled to an adjusting element (41) of the hydraulic machine (1) and the control piston (18) and moves the control piston (18) into the neutral position after the desired deflection of the hydraulic machine has been achieved.

15. Hydrostatic adjusting device (8) according to claim 13, characterized in that the force level of the position return device (40) of the servo adjusting unit (8) can be varied.

16. Hydraulic machine (1) having a hydrostatic adjusting device (8) according to claim 1, characterized in that the hydraulic machine (1) can be operated in an open or closed hydraulic circuit.

17. Hydraulic machine (1) having a hydrostatic adjusting device (8) according to claim 1 further comprising a blind bore (51) which is arranged at a first end of the control piston (18) in the axial direction of the control piston (18) and the bottom (57) of which has a further bore (52), and a radial duct (58) which is through-connected to the blind bore (51), a slide (53) being arranged within the blind bore, which slide (53) has an axial longitudinal bore (54) and a radial transverse bore (55) which is through-connected to the longitudinal bore (54), and which slide (53) is arranged such that it is prestressed against the bottom (57) by way of a valve spring (36) and can be displaced axially in such a way that, if the slide (53) is not loaded in the direction of the bottom (57), there is a through-connection between the radial bore (55) and the radial duct (58), wherein the through-connection is configured to be opened or closed by way of an axial displacement of the slide (53) in the direction of the bottom (57).

* * * * *